(12) United States Patent
Shibano et al.

(10) Patent No.: US 11,836,660 B2
(45) Date of Patent: Dec. 5, 2023

(54) CHARGE MANAGEMENT DEVICE, CHARGE MANAGEMENT METHOD, AND MOBILE BODY

(71) Applicant: TOYOTA JIDOSHA KABUSHIKI KAISHA, Aichi-ken (JP)

(72) Inventors: Takumi Shibano, Nagoya (JP); Kazutaka Kimura, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 196 days.

(21) Appl. No.: 17/478,959

(22) Filed: Sep. 20, 2021

(65) Prior Publication Data

US 2022/0129815 A1   Apr. 28, 2022

(30) Foreign Application Priority Data

Oct. 22, 2020   (JP) ................. 2020-177590

(51) Int. Cl.
| | |
|---|---|
| *G06Q 10/0631* | (2023.01) |
| *G06Q 10/109* | (2023.01) |
| *G06Q 50/06* | (2012.01) |
| *B60L 53/66* | (2019.01) |
| *B60L 53/62* | (2019.01) |

(Continued)

(52) U.S. Cl.
CPC ........ *G06Q 10/06315* (2013.01); *B60L 53/62* (2019.02); *B60L 53/66* (2019.02); *G05B 19/042* (2013.01); *G06F 40/40* (2020.01); *G06Q 10/06312* (2013.01); *G06Q 10/109* (2013.01); *G06Q 50/06* (2013.01); *H02J 7/0071* (2020.01); *G05B 2219/2639* (2013.01)

(58) Field of Classification Search
CPC ....... G06Q 10/06315; G06Q 10/06312; G06Q 10/109; G06Q 50/06; B60L 53/62; B60L 53/66; B60L 2240/622; B60L 2250/12; B60L 2250/14; B60L 53/00; B60L 53/60; G05B 19/042; G05B 2219/2639; G06F 40/40; H02J 7/0071; H02J 7/007188; H02J 2310/48; H02J 7/00032; H02J 7/0047; Y02T 10/70; Y02T 10/7072; Y02T 90/14; Y02T 90/12; Y02T 90/16

USPC ...................................................... 700/295
See application file for complete search history.

(56) References Cited

U.S. PATENT DOCUMENTS

| | | | |
|---|---|---|---|
| 2005/0119771 A1 * | 6/2005 | Amundson | G05D 23/1917 700/86 |
| 2010/0217485 A1 | 8/2010 | Ichishi | |

(Continued)

FOREIGN PATENT DOCUMENTS

| | | |
|---|---|---|
| JP | 2009-136109 A | 6/2009 |
| JP | 2011-188728 A | 9/2011 |

(Continued)

*Primary Examiner* — Mohammad Ali
*Assistant Examiner* — Saad M Kabir
(74) *Attorney, Agent, or Firm* — HAUPTMAN HAM, LLP

(57) ABSTRACT

A charge management device includes an interface that acquires information related to a schedule of a user, and a control unit that manages a charge schedule of a battery of a mobile body used by the user based on the information related to the schedule of the user. The interface outputs a question about the schedule of the user and acquires an answer to the question from the user. The control unit updates the schedule of the user based on the answer from the user.

20 Claims, 3 Drawing Sheets

(51) Int. Cl.
*G06F 40/40* (2020.01)
*H02J 7/00* (2006.01)
*G05B 19/042* (2006.01)

(56) References Cited

U.S. PATENT DOCUMENTS

| | | |
|---|---|---|
| 2011/0202221 A1 | 8/2011 | Sobue et al. |
| 2013/0179061 A1* | 7/2013 | Gadh .................. B60L 53/305 |
| | | 701/1 |
| 2014/0164919 A1 | 6/2014 | Ikeda |
| 2014/0191722 A1 | 7/2014 | Usuki et al. |

FOREIGN PATENT DOCUMENTS

| | | |
|---|---|---|
| JP | 2013-065265 A | 4/2013 |
| JP | 2014115838 A | 6/2014 |
| JP | 201632339 A | 3/2016 |
| JP | 2016-134160 A | 7/2016 |
| JP | 2017-079577 A | 4/2017 |
| WO | 2020100288 A1 | 5/2020 |

* cited by examiner

CHARGE MANAGEMENT DEVICE, CHARGE MANAGEMENT METHOD, AND MOBILE BODY

CROSS-REFERENCE TO RELATED APPLICATION

This application claims priority to Japanese Patent Application No. 2020-177590 filed on Oct. 22, 2020, incorporated herein by reference in its entirety.

BACKGROUND

1. Technical Field

The present disclosure relates to a charge management device, a charge management method, and a mobile body.

2. Description of Related Art

In the related art, as a configuration related to charging of a vehicle battery, for example, WO 2020-100288 discloses that a charge schedule of a vehicle is generated based on predicted power consumption of the vehicle calculated based on future traveling schedule of the vehicle and charging conditions. For example, Japanese Unexamined Patent Application Publication No. 2014-115838 (JP 2014-115838 A) discloses means for inquiring a user about a charge schedule of the vehicle and discloses that the charge schedule of the vehicle is changed based on the inquiry result. For example, Japanese Unexamined Patent Application Publication No. 2016-32339 (JP 2016-32339 A) discloses that the charge schedule and power factor of the battery are determined so as to cause the battery to supply reactive power required to take in more power while maintaining a stable state of the power distribution system and satisfy a scheduled connection end time of the battery.

SUMMARY

It is required to improve the convenience of the user regarding charging of the mobile body.

The purpose of the present disclosure made in view of such circumstances is to improve the convenience of the user.

A charge management device according to an embodiment of the present disclosure includes: an interface that acquires information related to a schedule of a user; and a control unit that manages a charge schedule of a battery of a mobile body used by the user based on the information related to the schedule of the user. The interface outputs a question about the schedule of the user and acquires an answer to the question from the user. The control unit updates the schedule of the user based on the answer from the user.

A charge management method according to an embodiment of the present disclosure includes acquiring information related to a schedule of a user. The charge management method includes managing charging of a battery of a mobile body used by the user based on the information related to the schedule of the user. The charge management method includes outputting a question about the schedule of the user. The charge management method includes acquiring an answer to the question from the user. The charge management method includes updating the schedule of the user based on the answer from the user.

A mobile body according to one embodiment of the present disclosure is used by a user. The mobile body includes: a battery; an interface that acquires information related to a schedule of the user; and a control unit that manages charging of the battery based on the information related to the schedule of the user. The interface outputs a question about the schedule of the user and acquires an answer to the question from the user as the information related to the schedule of the user.

According to the charge management device, the charge management method, and the mobile body according to the embodiments of the present disclosure, the convenience of the user can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration Example of Charge Management System 1

Figure 1:
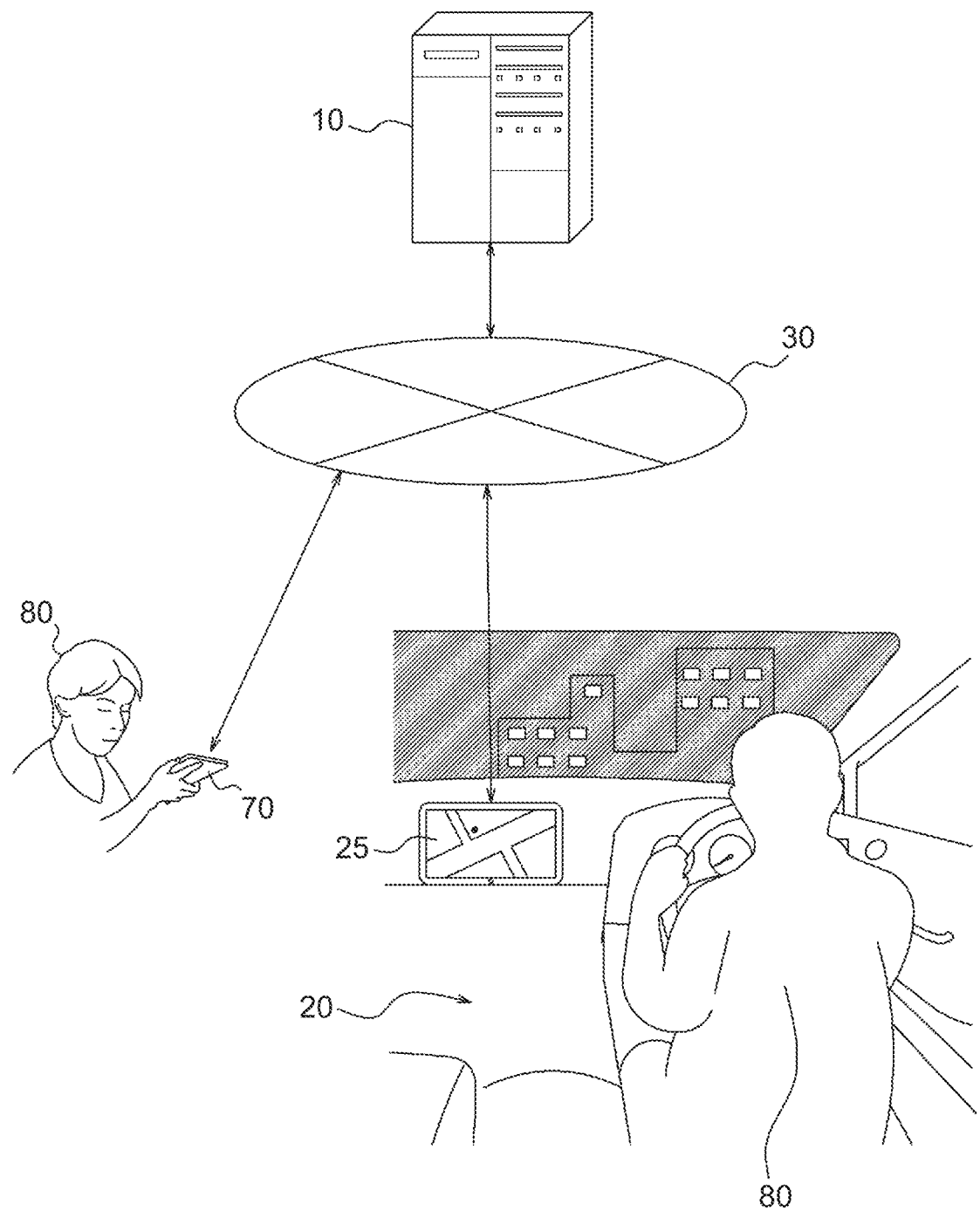
FIG. 1 is a schematic diagram showing a configuration of a charge management system according to an embodiment.
Figure 2:
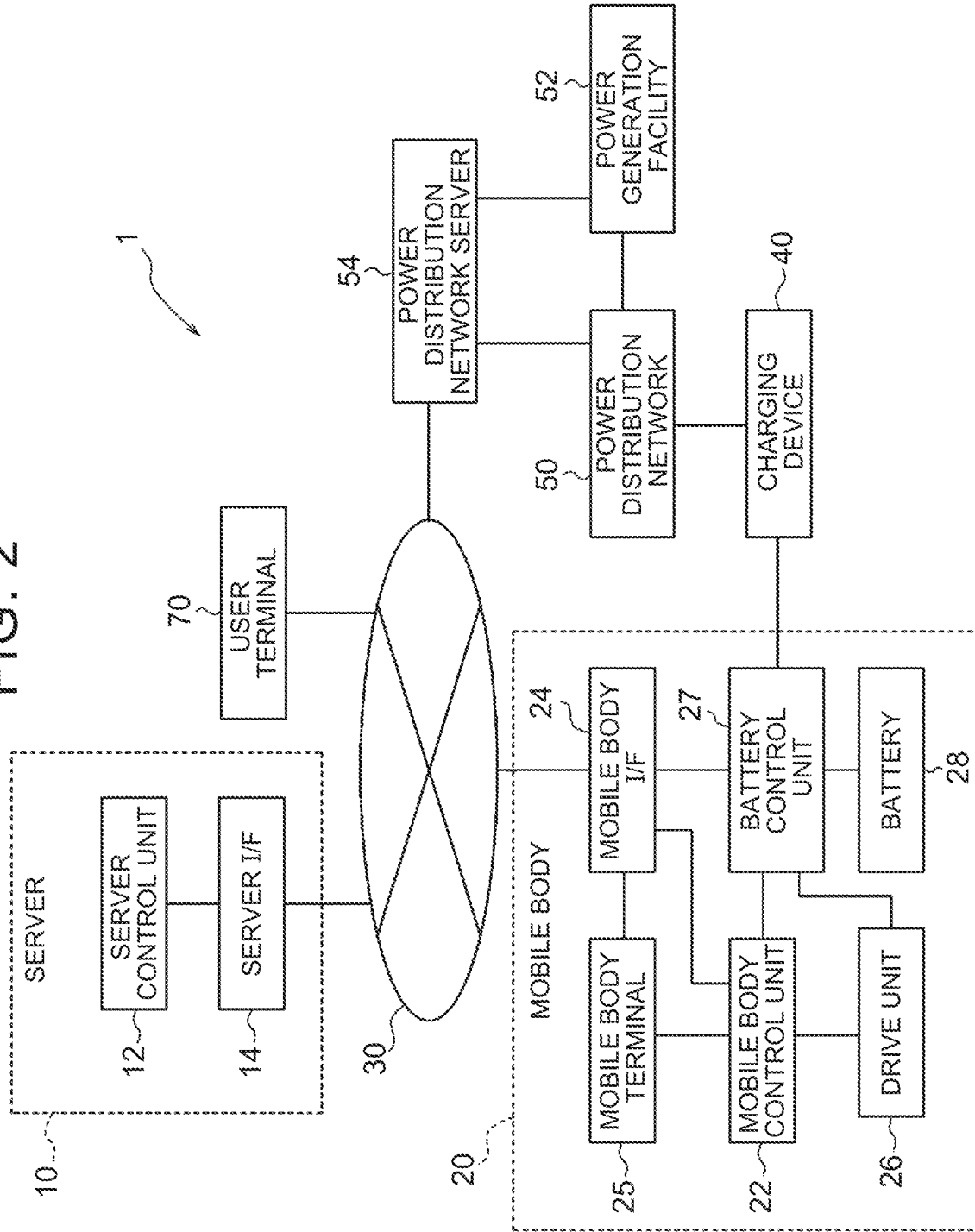
FIG. 2 is a block diagram showing the configuration of the charge management system according to the embodiment.

As shown in FIGS. 1 and 2, a charge management system 1 according to an embodiment includes a server 10, a mobile body 20, and a charging device 40. The mobile body 20 includes a battery 28 and is driven using electric power charged in the battery 28. The charging device 40 charges the battery 28 with electric power supplied from a power generation facility 52 via a power distribution network 50. The charge management system 1 manages a charge schedule of the battery 28 of the mobile body 20. The charge management system 1 manages a period for charging the battery 28 as the charge schedule. Further, the charge management system 1 may set a target value of the charge rate of the battery 28 based on the charge schedule. Further, the charge management system 1 may set a starting time of charging of the battery 28 based on the charge schedule. Further, the charge management system 1 may set an ending time of charging of the battery 28 based on the charge schedule.

A user 80 of the mobile body 20 uses the mobile body 20 by boarding the mobile body 20 and moving. In other words, the mobile body 20 moves with the user 80 on board therein.

The charge management system 1 manages the charge schedule of the battery 28 of the mobile body 20. The charge management system 1 can manage the charge schedule of the battery 28 and complete charging of the battery 28 such that the user 80 of the mobile body 20 is not aware of the charge rate of the battery 28. Hereinafter, a configuration example of the charge management system 1 will be described.

Server 10

The server 10 includes a server control unit 12 and a server interface 14. The server interface 14 is also referred to as a server I/F 14.

The server control unit 12 controls each component of the server 10. The server control unit 12 is also simply referred to as a control unit. The server control unit 12 may be configured to include one or more processors. According to the embodiment, the "processor" is a general-purpose processor or a dedicated processor specialized for specific processing. However, the processor is not limited thereto. The server control unit 12 may be configured to include one or more dedicated circuits. The dedicated circuit may include, for example, a field-programmable gate array (FPGA) or an application-specific integrated circuit (ASIC). The server control unit 12 may be configured to include the dedicated circuit instead of the processor, or may be configured to include the dedicated circuit together with the processor.

The server 10 may further include a storage unit. The storage unit is, for example, a semiconductor memory, a magnetic memory, or an optical memory. However, the storage unit is not limited to these memories. The storage unit may function as, for example, a main storage device, an auxiliary storage device, or a cache memory. The storage unit may include an electromagnetic storage medium such as a magnetic disk. The storage unit stores arbitrary information used for the operation of the server 10. The storage unit may store, for example, a system program, an application program, or the like. The storage unit may be included in the server control unit 12.

The server I/F 14 outputs information or data or the like from the server control unit 12, or inputs information or data or the like to the server control unit 12. The server I/F 14 is also simply referred to as an interface or I/F.

The server I/F 14 may include a communication module configured to be communicable with the mobile body 20 via a network 30. The communication module may include a communication module corresponding to mobile communication standards such as the fourth generation (4G) or the fifth generation (5G). However, the communication module is not limited to this. The server I/F 14 may be configured to be connectable to the communication module.

The server I/F 14 may include an input device that receives input of information, data, or the like from the user 80. The input device may be configured to include, for example, a touch panel or a touch sensor, or a pointing device such as a mouse. The input device may be configured to include a physical key. The input device may be configured to include a voice input device such as a microphone. The server I/F 14 may be configured to be connectable to the input device.

The server I/F 14 may include an output device that outputs information, data, or the like to the user 80. The output device may include, for example, a display device that outputs visual information such as images, characters, or figures. The display device may be configured to include, for example, a liquid crystal display (LCD), an organic electro-luminescence (EL) display or an inorganic EL display, a plasma display panel (PDP), or the like. The display device is not limited to the displays above, and may be configured to include various other types of displays. The display device may be configured to include a light emitting device such as a light emission diode (LED) or a laser diode (LD). The display device may be configured to include various other devices. The output device may include, for example, an audio output device such as a speaker that outputs auditory information such as audio. The output device is not limited to the examples above, and may include various other devices. The server I/F 14 may be configured to be connectable to the output device.

The server 10 may include one server or a plurality of server devices capable of communicating with each other. The server 10 is also referred to as the charge management device.

Mobile Body 20

The mobile body 20 includes a drive unit 26 and the battery 28 that supplies electric power to the drive unit 26. The mobile body 20 moves by the operation of the drive unit 26. The drive unit 26 may include a motor. The drive unit 26 may include an engine. The drive unit 26 is supplied with the electric power that is discharged from the battery 28 as at least a part of the energy for operating the drive unit 26 itself. The battery 28 discharges the precharged electric power and supplies the electric power to the drive unit 26. The battery 28 is charged with the electric power supplied from the charging device 40.

The mobile body 20 further includes a battery control unit 27 that controls charging and discharging of the battery 28. The battery control unit 27 is connected to the charging device 40 and the drive unit 26. The battery control unit 27 may control charging from the charging device 40 to the battery 28 by controlling the charging current flowing from the charging device 40 to the battery 28. The battery control unit 27 may control discharge from the battery 28 to the drive unit 26 by controlling discharge current flowing from the battery 28 to the drive unit 26.

The mobile body 20 further includes a mobile body control unit 22. The mobile body control unit 22 controls the drive unit 26 to control movement of the mobile body 20. The mobile body control unit 22 may control the battery control unit 27 to control charging and discharging of the battery 28. The mobile body control unit 22 is also simply referred to as a control unit. The mobile body control unit 22 may include one or more processors. The mobile body control unit 22 may include one or more dedicated circuits instead of the processor, or may include one or more dedicated circuits together with the processor. The mobile body control unit 22 may be configured to further include a storage unit.

The mobile body 20 further includes a mobile body interface 24. The mobile body interface 24 is also referred to as a mobile body I/F 24. The mobile body I/F 24 is also simply referred to as an interface or I/F. The mobile body I/F 24 may include a communication module configured to be communicable with the server 10 via the network 30. The communication module of the mobile body I/F 24 may be configured in the same manner as or similar to the configuration exemplified as the communication module of the server I/F 14. The mobile body I/F 24 may be configured to be connectable to the communication module. The mobile body I/F 24 may include, for example, an in-vehicle communication device. The mobile body I/F 24 is connected to the mobile body control unit 22 and the battery control unit 27 so as to be mutually communicable with each other via an in-vehicle network such as a controller area network (CAN) or a dedicated line.

The mobile body 20 further includes a mobile body terminal 25, although it is not essential. The mobile body terminal 25 may be installed inside the mobile body 20. When the mobile body 20 is a vehicle, the mobile body terminal 25 may be configured as, for example, a navigation device. The mobile body terminal 25 is not limited to the examples above, and may include various devices.

The mobile body terminal 25 may include a control unit configured to include a processor and the like. The mobile body terminal 25 may include a storage unit. The mobile body terminal 25 may be communicably connected to the mobile body I/F 24. The mobile body terminal 25 may output information to the server 10 or acquire information from the server 10 via the mobile body I/F 24 and the network 30. The mobile body terminal 25 may include an input device that receives an input from the user 80. The input device of the mobile body terminal 25 may be configured to be the same as or similar to the configuration exemplified as the input device of the server I/F 14. The mobile body terminal 25 may include an output device that outputs information to the user 80. The output device of the mobile body terminal 25 may be configured to be the same as or similar to the configuration exemplified as the output device of the server I/F 14. The server control unit 12 of the server 10 or the mobile body control unit 22 of the mobile body 20 may receive the input of the user 80 from the mobile body terminal 25, or may output the information to be notified to the user 80 to the mobile body terminal 25.

The mobile body terminal 25 may be included in the mobile body I/F 24. The mobile body I/F 24 may include an input device that receives input of information, data, or the like from the user 80 of the mobile body 20. The mobile body I/F 24 may be configured to be connectable to the input device. The input device of the mobile body I/F 24 may be configured to be the same as or similar to the configuration exemplified as the input device of the server I/F 14. The mobile body I/F 24 may include an output device that outputs information, data, or the like to the user 80 of the mobile body 20. The mobile body I/F 24 may be configured to be connectable to the output device. The output device of the mobile body I/F 24 may be configured to be the same as or similar to the configuration exemplified as the output device of the server I/F 14.

The mobile body control unit 22 is communicably connected to the network 30 via the mobile body I/F 24. The mobile body control unit 22 may acquire information instructing charging of the battery 28 from the server 10. The information instructing charging of the battery 28 is also referred to as charge instruction information. The charge instruction information may include information that specifies time when charge of the battery 28 is started. That is, the charge instruction information may include information related to the charge schedule of the battery 28. The charge instruction information may include information that specifies a target value of the charge rate of the battery 28. The mobile body control unit 22 may control the battery control unit 27 based on the charge instruction information acquired from the server 10 to control charging of the battery 28.

The battery control unit 27 is communicably connected to the network 30 via the mobile body I/F 24. The battery control unit 27 may output information related to the charge rate of the battery 28 to the server 10. The battery control unit 27 may acquire the charge instruction information from the server 10. The battery control unit 27 may control charging of the battery 28 based on the charge instruction information acquired from the server 10.

The battery control unit 27 may be configured integrally with the battery 28. That is, the function of the battery control unit 27 may be realized by the configuration included in the battery 28. Further, the battery control unit 27 may be included in the mobile body control unit 22. That is, the function of the battery control unit 27 may be realized by the mobile body control unit 22.

The number of mobile bodies 20 to be managed by the charge management system 1 is not limited to one, and may be two or more. The mobile body 20 may be moved by driving or operation of the user 80. The mobile body 20 may be moved by autonomous driving or automatic operation controlled by the mobile body control unit 22. When the mobile body 20 is a vehicle, the autonomous driving may be performed at any level from level 1 to level 5 defined by, for example, the Society of Automotive Engineers (SAE). The autonomous driving is not limited to the exemplified definition, and may be performed based on other definitions.

The mobile body 20 may further include a position information acquisition unit. The position information acquisition unit acquires position information of the mobile body 20 itself. The position information acquisition unit may include a receiver compatible with the satellite positioning system. The receiver compatible with the satellite positioning system may include, for example, a global positioning system (GPS) receiver. The mobile body 20 may output, from the mobile body I/F 24 to the server 10, the position information of the mobile body 20 itself acquired by the position information acquisition unit. The mobile body control unit 22 may control the autonomous driving based on the position information of the mobile body 20.

User Terminal 70

The charge management system 1 may further include a user terminal 70. The user terminal 70 may be held by the user 80 of the mobile body 20. The user terminal 70 may be configured to be usable when the user 80 of the mobile body 20 is away from the mobile body 20. The user terminal 70 may include a mobile terminal such as a smartphone. The user terminal 70 may include a personal computer (PC) such as a notebook PC or a tablet PC. The user terminal 70 is not limited to the examples above, and may include various devices.

The user terminal 70 may include a control unit including a processor and the like. The user terminal 70 may include a storage unit. The user terminal 70 may include a communication unit configured to include a communication module configured to be communicable with the server 10 or the mobile body 20 via the network 30. The communication module may include a communication module corresponding to mobile communication standards such as the fourth generation (4G) or the fifth generation (5G). However, the communication module is not limited to this. The user terminal 70 may include an input device that receives an input from the user 80. The user terminal 70 may include an output device that outputs information to the user 80. The server control unit 12 of the server 10 or the mobile body control unit 22 of the mobile body 20 may receive the input of the user 80 from the user terminal 70, or may output the information to be notified to the user 80 to the user terminal 70.

Charging Device 40 and Power Distribution Network 50

The charging device 40 supplies the electric power to the battery control unit 27 to charge the battery 28. The charging device 40 supplies the electric power supplied from the power distribution network 50 to the battery control unit 27.

The power distribution network 50 electrically connects a power supply source such as the power generation facility 52 and a power supply destination such as the charging device 40. In the present embodiment, the power distribution network 50 is configured to electrically connect the power generation facility 52 and the charging device 40 such that the power generation facility 52 can supply the electric power to the charging device 40.

The power generation facility 52 includes a power plant that generates power in various forms such as thermal power generation, hydroelectric power generation, nuclear power generation, and renewable energy power generation. The renewable energy power generation includes, for example, solar power generation, wind power generation, geothermal power generation, or hydroelectric power generation.

In the present embodiment, the charge management system 1 is assumed to be communicably connected to a power distribution network server 54 via the network 30. The power distribution network server 54 may be configured to be the same as or similar to the server 10. The power distribution network server 54 acquires information about the state of the power distribution network 50. Information related to the state of the power distribution network 50 is also referred to as power distribution network information. The power distribution network information includes information related to an electric energy that is in demand at the power supply destination of the power distribution network 50. The power distribution network server 54 may generate information instructing the electric energy to be generated to the power generation facility 52 as the power supply source so as to satisfy a power demand by the power supply destination of the power distribution network 50 and output the information to the power generation facility 52.

The power distribution network server 54 may acquire information related to the state of the power generation facility 52. The information related to the state of the power generation facility 52 is also referred to as power generation facility information. The power generation facility information may include information related to the electric energy that can be output by the power generation facility 52 at the present time point, and may include information related to the electric energy that is estimated to be outputtable by the power generation facility 52 in the future. The power distribution network server 54 may generate the information instructing the electric energy to be generated to the power generation facility 52 based on the power generation facility information.

The power distribution network server 54 may output the power distribution network information to the server 10 or the mobile body 20. The server control unit 12 of the server 10 or the mobile body control unit 22 of the mobile body 20 may control charging of the battery 28 of the mobile body 20 based on the power distribution network information.

Operation Example of Charge Management System 1

The user 80 uses the mobile body 20 to move by boarding the mobile body 20. When the mobile body 20 moves with the user 80 on board, the electric energy consumed by the drive unit 26 of the mobile body 20 is determined based on a mode of usage such as the number of people boarding the mobile body 20 or a travel distance of the mobile body 20. When a charged electric energy of the battery 28 is smaller than the power consumption of the mobile body 20 while the user 80 is using the mobile body 20, the user 80 needs to charge the battery 28 while the user 80 is using the mobile body 20. The electric energy charged in the battery 28 needs to be equal to or larger than the power consumption while the mobile body 20 is being used to avoid charging of the battery 28 while the mobile body 20 is being used.

The charge management system 1 manages the charge schedule of the battery 28 and controls the charge rate of the battery 28 such that the user 80 of the mobile body 20 does not need to worry about the charged electric energy of the battery 28 before the user 80 users the mobile body 20. With the process above, the convenience of the user 80 is improved.

Hereinafter, a mode in which the server control unit 12 of the server 10 manages the charge schedule of the battery 28 will be described. The main body that manages the charge schedule of the battery 28 may be replaced by the mobile body control unit 22 of the mobile body 20. That is, the function as the charge management device may be realized by the server control unit 12 or by the mobile body control unit 22.

The server control unit 12 or the mobile body control unit 22 may notify the user 80 of information or receive input of the information from the user 80 by the mobile body terminal 25 or the user terminal 70 when the user 80 is on board the mobile body 20 or is near the mobile body 20. The server control unit 12 or the mobile body control unit 22 may notify the user 80 of information or receive input of the information from the user 80 by the user terminal 70 when the user 80 is away from the mobile body 20.

Charge Management Based on Schedule of User 80

The charge management system 1 may estimate the mode of usage of the mobile body 20 based on the schedule of the user 80 of the mobile body 20. The charge management system 1 may generate or update the charge schedule of the battery 28 of the mobile body 20 based on the estimation result of the mode of usage before the user 80 uses the mobile body 20. The charge management system 1 may generate a charge instruction for the battery 28 based on the charge schedule and control charging of the battery 28. A shortage of the charged electric energy of the battery 28 is less likely to occur while the mobile body 20 is being used by managing the charge schedule of the battery 28 based on the schedule of the user 80. Consequently, the convenience of the user 80 can be improved. Hereinafter, a mode in which the server control unit 12 manages the charge schedule of the battery 28 based on the schedule of the user 80 will be described. The mode described below may be performed by the mobile body control unit 22.

The server control unit 12 acquires information related to the schedule of the user 80 using the server I/F 14. The server I/F 14 may receive the input of the schedule of the user 80 from the user 80. The server I/F 14 may acquire information related to the schedule of the user 80 from the user terminal 70 or the mobile body terminal 25 of the mobile body 20. The information related to the schedule of the user 80 may include, for example, the time when the user 80 starts using the mobile body 20, the number of people boarding the mobile body 20, a distance or section in which the user 80 uses the mobile body 20 or the like. The information related to the schedule of the user 80 is also referred to as schedule information. The schedule information may include a purpose for which the user 80 uses the mobile body 20. The schedule information is not limited to the examples above and may include various types of information.

For example, the server control unit 12 may receive the input related to the scheduled time at which the user 80 boards the mobile body 20 and departs on a specific date (for example, tomorrow) from the user 80 using the server I/F 14. Specifically, the user 80 may enter voice information by uttering "I'm going to work tomorrow, so I'll leave at 7:00 am", for example. The server control unit 12 may generate the charge schedule based on the voice information input by the user 80 such that charging of the mobile body 20 completes by 7:00 am. The server control unit 12 may notify the user 80 that charging of the mobile body 20 completes by 7:00 am. The server control unit 12 may notify the user 80 by audibly outputting "Charging up to 80% completes by 7:00 am" from the mobile body terminal 25 or the user terminal 70.

The server control unit 12 generates a question about the schedule of the user 80 and causes the server I/F 14 to output the question such that the schedule of the user 80 can be updated to detailed or accurate information. That is, the server I/F 14 outputs the question about the schedule of the user 80.

The server control unit 12 acquires an answer to the question about the schedule of the user 80 from the server I/F 14. That is, the server I/F 14 encourages the user 80 to input the answer to the question about the schedule of the user 80, and outputs the received input content to the server control unit 12 as the answer.

The server control unit 12 updates the schedule of the user 80 based on the acquired answer.

The question about the schedule of the user 80 may include, for example, a question confirming the scheduled time when the user 80 boards the mobile body 20 and departs tomorrow. Specifically, the server control unit 12 may notify the user 80 of the time that the server control unit 12 identifies as the scheduled departure time of the user 80 tomorrow, and generate a question for confirming whether the scheduled departure time is correct. When the server control unit 12 receives an answer from the user 80 that the scheduled departure time notified is incorrect, the server control unit 12 may generate a question confirming the correct scheduled departure time. When the server control unit 12 receives an answer from the user 80 that the scheduled departure time notified is correct, the server control unit 12 may generate the charge schedule of the battery 28 of the mobile body 20 based on the scheduled departure time that has been confirmed to be correct.

The question about the schedule of the user 80 may include, for example, a question asking whether the user 80 uses the mobile body 20 on the weekend. Specifically, the server control unit 12 may generate a question to notify the user 80 that the user 80 is planning to go out on the weekend and confirm whether the schedule is correct. When the server control unit 12 receives an answer from the user 80 that the notified schedule is incorrect, the server control unit 12 may generate a question confirming the correct schedule. When the server control unit 12 receives an answer from the user 80 that the notified schedule is correct, the server control unit 12 may generate the charge schedule of the battery 28 of the mobile body 20 based on the schedule that has been confirmed to be correct.

The server control unit 12 may learn the schedule of the user 80. When the server control unit 12 acquires, for example, information indicating that the user 80 departs at 7:00 am to go to work as the information input from the user 80, the server control unit 12 may learn that the departure time of the work day is 7:00 am. The server control unit 12 may update the schedule of the user 80 based on the learning result.

The server control unit 12 may estimate the schedule of the user 80. When the server control unit 12 acquires, for example, information indicating that the user 80 departs at 7:00 am to go to work as the information input from the user 80, the server control unit 12 may estimate that the user 80 departs at 7:00 am on other work days. The server control unit 12 may update the schedule of the user 80 based on the estimation result.

The server control unit 12 may generate a question confirming whether the learning result or the estimation result of the schedule of the user 80 is correct. Specifically, the server control unit 12 notifies the user 80 of the learning result or the estimation result that the user 80 departs at 7:00 am on the work day by causing the mobile body terminal 25 or the user terminal 70 to audibly output "Tomorrow is the work day, so the departure time is 7:00 am", for example. In response to the above, the user 80 may audibly input the information by uttering as "Tomorrow is Tuesday, so I'll leave at 6:30 am", for example. The server control unit 12 may learn that the departure time on Tuesday is 6:30 am based on the voice information input from the user 80, and generate the charge schedule so as to complete charging of the mobile body 20 by 6:30 am. The server control unit 12 may notify the user 80 that the departure time on Tuesday is learned by causing the mobile body terminal 25 or the user terminal 70 to audibly output "Learning that the departure time on Tuesday is 6:30 am has been completed", for example. Further, the server control unit 12 may notify the user 80 that charging of the mobile body 20 completes by 6:30 am by causing the mobile body terminal 25 or the user terminal 70 to audibly output that "Charging up to 80% completes by 6:30 am", for example.

The server control unit 12 may notify the user 80 that the charge schedule is generated based on the schedule of the user 80. For example, the server control unit 12 may notify the user 80 of completion of charging by the departure time by causing the mobile body terminal 25 or the user terminal 70 to audibly output "You are planning to go out with your family on the weekend. The battery is charged by that time" based on the schedule that the user 80 goes out with his/her family on the weekend. In response to this, the user 80 may audibly input information that affirms the notification from the server control unit 12 by uttering "I forget my schedule on the weekend. It is helpful to have the battery charged", for example. The user 80 may audibly input information that corrects the notification from the server control unit 12 by uttering "I have no plans to go out", for example. The user 80 may input information through an operation of a touch panel or the like, instead of input by voice.

The server control unit 12 may estimate the travel distance when the user 80 uses the mobile body 20 based on the schedule of the user 80. For example, when the user 80 uses the mobile body 20 for going to work, the server control unit 12 may estimate the travel distance based on the distance between the home and the workplace of the user 80. The server control unit 12 may estimate the travel distance based on the distance to the destination specified by the schedule of the user 80. The server control unit 12 may estimate the destination based on the schedule of the user 80. The server control unit 12 may determine a target value of the charge rate of the battery 28 based on the estimation result of the travel distance. The target value of the charge rate of the battery 28 is also referred to as a target charge rate.

The server control unit 12 may set the target charge rate of the battery 28 to the maximum charge rate (for example, 100%). The server control unit 12 may set the target charge rate of the battery 28 to a value smaller than the maximum charge rate (for example, 80%) such that the battery 28 is less likely to deteriorate. The server control unit 12 may set the target charge rate to the minimum value within a range in which the mobile body 20 can be used to enable the user 80 to move in the target section without charging the battery 28. The server control unit 12 may generate the charge schedule based on a difference between the target charge rate and the charge rate of the battery 28 before charging. As the target charge rate becomes lower, the time required to complete charging the battery 28 is shortened. The server control unit 12 may set the target charge rate in accordance with the charge schedule.

Procedure Example of Charge Management Method

Figure 3:
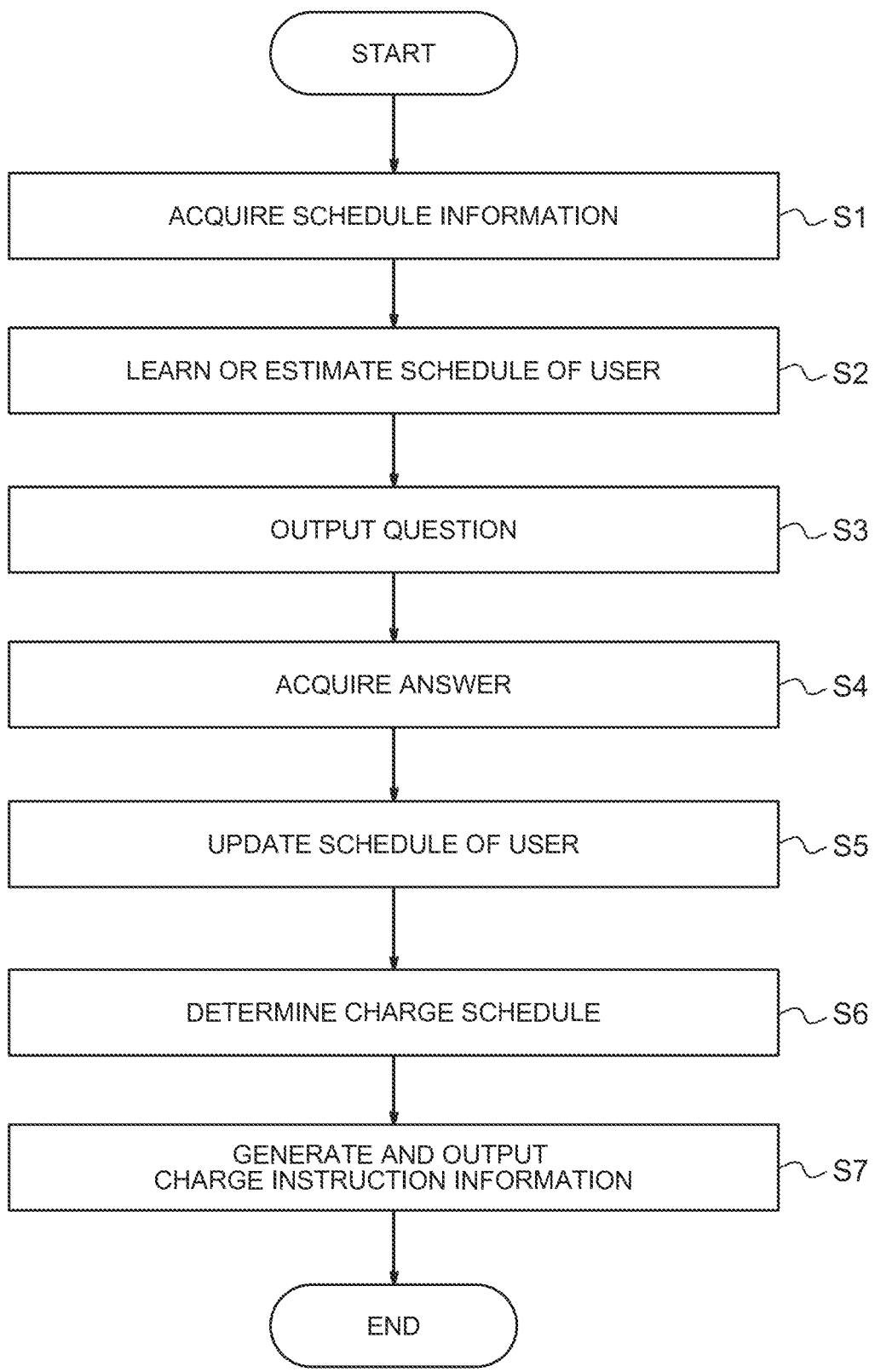
FIG. 3 is a flowchart showing a procedure example of a charge management method according to the embodiment.

The server control unit 12 may execute a charge management method including the procedure of a flowchart illustrated in FIG. 3. The charge management method may be realized as a charge management program executed by a processor constituting the server control unit 12.

The server control unit 12 acquires the schedule information of the user 80 (step S1).

The server control unit 12 learns or estimates the schedule information of the user 80 (step S2).

The server control unit 12 outputs a question to the user 80 (step S3).

The server control unit 12 acquires the answer from the user 80 (step S4).

The server control unit 12 updates the schedule of the user 80 based on the answer from the user 80 (step S5).

The server control unit 12 determines the charge schedule of the battery 28 of the mobile body 20 used by the user 80 based on the schedule of the user 80 (step S6).

The server control unit 12 generates charge instruction information for the battery 28 based on the charge schedule and outputs the charge instruction information to the battery control unit 27 (step S7). After executing the procedure in step S7, the server control unit 12 may end the execution of the procedure of the flowchart shown in FIG. 3.

The server control unit 12 does not have to execute a part of each step shown in FIG. 3. For example, the server control unit 12 may omit execution of the procedure in step S2, or may omit the execution of the procedures in steps S3 and S4. The server control unit 12 may execute the steps while the order of each step illustrated in FIG. 3 is changed. For example, the server control unit 12 may execute the procedures in steps S3 and S4 before executing the procedure in step S2. For example, the server control unit 12 may determine the charge schedule in the procedure in step S6, then return to the procedure in step S5, update the schedule of the user 80, and determine the charge schedule again in the procedure in step S6.

The charge management method including the procedure illustrated in FIG. 3 may be executed by the mobile body control unit 22. The charge management method may be realized as a charge management program executed by a processor constituting the mobile body control unit 22.

As described above, the charge management system 1 according to the present embodiment manages the charge schedule of the battery 28 of the mobile body 20 to control charging of the battery 28. With the process above, the user 80 does not have to worry about the charged electric energy of the battery 28 before using the mobile body 20. Consequently, the convenience of the user 80 is improved.

Other Embodiments

Charge Management Based on Power Distribution Network Information

The charge management system 1 may manage the charge schedule of the battery 28 or generate the charge instruction of the battery 28 based on the power distribution network information. Equalization of a power demand of the power distribution network 50 can be achieved through management of the charge schedule of the battery 28 or generation of the charge instruction based on the power distribution network information. Hereinafter, a mode in which the server control unit 12 manages charging of the battery 28 based on the power distribution network information will be described. The mode described below may be performed by the mobile body control unit 22.

The server control unit 12 acquires the power distribution network information from the power distribution network server 54 by the server I/F 14. That is, the server I/F 14 acquires the power distribution network information from the power distribution network server 54 and outputs the power distribution network information to the server control unit 12. The server control unit 12 manages the charge schedule of the battery 28 based on the schedule of the user 80 and the power distribution network information.

The power distribution network information may include information related to the power demand of the power distribution network 50. The power distribution network server 54 may calculate the total of electric energy supplied by the power distribution network 50 as the power demand of the power distribution network 50. The power distribution network server 54 may predict future power demand.

The server control unit 12 may determine the charge schedule of the battery 28 of the mobile body 20 based on the information related to the power demand Specifically, the server control unit 12 may determine the charge schedule such that the battery 28 is charged during the period when the power demand becomes small. With the process above, equalization of the power demand of the power distribution network 50 can be realized. Further, when the power distribution network 50 is configured to supply the electric power to one city, equalization of the power demand in that one city can be realized.

The power distribution network information may include information related to a power distribution reserve capacity of the power distribution network 50. The power distribution reserve capacity corresponds to the electric energy that can increase supply in the power distribution network 50. The power distribution network server 54 may calculate a difference between the maximum generated electric energy of the power generation facility 52 that supplies the electric power to the power distribution network 50 and the present power demand as the present power distribution reserve capacity. The power distribution network server 54 may calculate the difference between the predicted value of the future generated electric energy of the power generation facility 52 that performs renewable energy power generation and the predicted value of the future power demand as the future power distribution reserve capacity. The power distribution network server 54 may calculate the difference between the predicted value of the maximum future generated electric energy that can be increased by the operation of the power generation facility 52 that is inactive and the predicted value of the future power demand as the future power distribution reserve capacity.

The server control unit 12 may determine the charge schedule of the battery 28 of the mobile body 20 based on the information related to the power distribution reserve capacity. Specifically, the server control unit 12 may determine the charge schedule such that the battery 28 is charged during the period when the power distribution reserve capacity becomes large. With the process above, stabilization of electric power supply to the power distribution network 50 can be realized. Further, when the power distribution network 50 is configured to supply the electric power to one city, stabilization of the electric power supply in that one city can be realized.

The generated electric energy in the power generation facility 52 that performs renewable energy power generation may vary depending on the natural conditions. The power generation facility 52 that performs renewable energy power generation is also referred to as a renewable energy power generation facility. For example, the electric energy generated by a solar power generation facility varies depending on an amount of solar radiation. For example, the electric energy generated by a wind power generation facility varies depending on the wind speed and direction. The power distribution network server 54 may estimate the power generation schedule of the renewable energy power generation facility based on information predicting the future natural conditions, and output the estimated power generation schedule as information related to the power distribution reserve capacity of the power distribution network 50.

The server control unit 12 may generate a charge instruction for the battery 28 based on the power generation schedule of the renewable energy power generation facility. The renewable energy can be easily used in a manner such that the charge instruction for the battery 28 is generated based on the power generation schedule of the renewable energy power generation facility.

The server control unit 12 may determine the charge schedule of the battery 28 of the mobile body 20 based on the power generation schedule of the renewable energy power generation facility located in a predetermined area. The predetermined area may be set as an area where the user 80 of the mobile body 20 of which charge schedule is managed by the charge management system 1 resides. The predetermined area is assumed to include the area where the charging device 40 is located. The server control unit 12 may determine the charge schedule such that a ratio of the electric power generated by the renewable energy power generation facility located in the predetermined area to the electric power charged in the battery 28 in the predetermined area increases. An electric power loss of the renewable energy power generation can be reduced by charging the battery 28 with the electric power generated by the renewable energy power generation facility located in the predetermined area. That is, a utilization efficiency of renewable energy in the predetermined area can be improved.

The predetermined area may be configured as an area having one city as a unit, for example. The energy utilization efficiency in one city can be improved in a manner such that the predetermined area is configured as an area having that one city as a unit.

Charge Management Based on Charge Schedule of Another Mobile Body 20

The charge management system 1 may update the charge schedule of the battery 28 of one mobile body 20 based on the charge schedule of the battery 28 of another mobile body 20 different from the one mobile body 20. Equalization of the power demand of the power distribution network 50 can be realized by considering the charge schedule of the battery 28 of each of a plurality of the mobile bodies 20.

For example, the server control unit 12 may determine the charge schedule of the battery 28 of each mobile body 20 such that the number of the mobile bodies 20 for charging the battery 28 at the same time is equalized. For example, the server control unit 12 may determine the charge schedule of each mobile body 20 so as to avoid that charging of the batteries 28 of the mobile bodies 20 that have carried the users 80 to homes starts all at once during the time when, for example, going home of the users 80 occurs concurrently (for example, between 5:00 μm and 7:00 pm). Specifically, the server control unit 12 may determine the charge schedule so as to shift the starting time of charging of the batteries 28 of the mobile bodies 20 from each other such that charging can complete during the time after each mobile body 20 returns to home of the user 80 until the next departure. For example, the server control unit 12 may set the starting time of charging of the battery 28 of one mobile body 20 to be the time after the time when charging of the battery 28 of another mobile body 20 completes. With the process above, the number of batteries 28 charged at the same time can be reduced. Consequently, equalization of the power demand can be realized.

When the mobile body control unit 22 of each mobile body 20 determines the charge schedule, each mobile body control unit 22 may output the charge schedule of the battery 28 of the mobile body 20 to another mobile body 20 so as to share the charge schedule with the other mobile body 20. The mobile body control unit 22 may output the charge schedule from the mobile body I/F 24. The mobile body control unit 22 may generate the charge schedule such that an overlap of the charge period of the battery 28 of which charging is controlled by the mobile body control unit 22 itself with the charge period of the battery 28 of the other mobile body 20 can be avoided. Specifically, the mobile body control unit 22 may generate the charge schedule of the batteries 28 of which charging is controlled by the mobile body control unit 22 itself so as to reduce the number of batteries 28 that are changed at the same time.

The server control unit 12 may determine the charge schedule of the battery 28 of each mobile body 20 based on the departure time of the mobile body 20. With the process above, it is possible to realize both completion of charging by the departure time of the mobile body 20 and reduction of the number of batteries 28 to be charged at the same time.

The server control unit 12 may determine the charge schedule of the battery 28 of each mobile body 20 based on the target charge rate while the user 80 sets the target charge rate of the battery 28 of the mobile body 20 to a small value within a range in which the user 80 can use the mobile body 20. With the process above, it becomes easy to charge the mobile body 20 such that the mobile body 20 gets ready for departure by the departure time of the mobile body 20. Moreover, the number of batteries 28 to be charged at the same time can further be reduced.

Although the embodiments according to the present disclosure have been described above based on the drawings and examples, it should be noted that those skilled in the art can easily make various modifications and alterations thereto based on the present disclosure. It should be noted, therefore, that these modifications and alterations are within the scope of the present disclosure. For example, the functions included in each means, each step, or the like can be rearranged so as not to be logically inconsistent, and a plurality of means, steps, or the like can be combined into one or divided.

What is claimed is:

1. A charge management device, comprising:
 an interface configured to acquire information related to a schedule of a user; and
 a control unit configured to manage a charge schedule of a battery of a mobile body used by the user based on the information related to the schedule of the user, wherein:
 the interface is configured to
  output a question about the schedule of the user, and
  acquires an answer to the question from the user, the answer being input by voice and including a scheduled departure time of the user,
 the control unit is configured to, in response to the answer acquired by the interface,
  update the schedule of the user based on the answer from the user, and
  generate the charge schedule of the battery of the mobile body based on the answer from the user,
 the interface is configured to acquire information related to a power distribution network that supplies electric power to charge the battery of the mobile body, and the control unit is configured to manage the charge schedule of the battery of the mobile body used by the user further based on the information related to the power distribution network.

2. The charge management device according to claim 1, wherein the control unit is configured to learn or estimate the schedule of the user.

3. The charge management device according to claim 2, wherein the control unit is configured to
generate a further question for confirming a learning result or an estimation result of the schedule of the user, and
receive an answer to the further question from the user using the interface.

4. The charge management device according to claim 1, wherein the control unit is configured to estimate a travel distance of the mobile body based on the schedule of the user and control a charge rate of the battery of the mobile body.

5. The charge management device according to claim 1, wherein the interface is configured to be connectable to an input device that receives input of the information related to the schedule of the user from the user.

6. The charge management device according to claim 1, wherein the interface is configured to be connectable to an output device that notifies the user of information.

7. The charge management device according to claim 1, wherein the control unit is configured to determine the charge schedule of the battery of the mobile body based on information related to a power distribution reserve capacity of the power distribution network.

8. The charge management device according to claim 1, wherein the control unit is configured to determine the charge schedule of the battery of the mobile body based on information related to a power demand of the power distribution network.

9. The charge management device according to claim 1, wherein the control unit is configured to determine the charge schedule of the battery of the mobile body based on a power generation schedule of a renewable energy power generation facility that supplies electric power to the power distribution network.

10. The charge management device according to claim 9, wherein the control unit is configured to determine the charge schedule of the battery of the mobile body based on the power generation schedule of the renewable energy power generation facility located in a predetermined area.

11. The charge management device according to claim 1, wherein the control unit is configured to output the charge schedule of the battery of the mobile body from the interface.

12. The charge management device according to claim 1, wherein the control unit is configured to update the charge schedule of the battery of the mobile body based on the charge schedule of a battery of another mobile body different from the mobile body.

13. A charge management method, comprising:
acquiring information related to a schedule of a user;
managing charging of a battery of a mobile body used by the user based on the information related to the schedule of the user;
outputting a question about the schedule of the user;
acquiring an answer to the question from the user, the answer being input by voice and including a scheduled departure time of the user; and
in response to the acquired answer, updating the schedule of the user based on the answer from the user and generating the charge schedule of the battery of the mobile body based on the answer from the user,
wherein the charge management method further comprises:
acquiring information related to a power distribution network that supplies electric power to charge the battery of the mobile body; and
managing charging of the battery of the mobile body used by the user further based on the information related to the power distribution network.

14. The charge management method according to claim 13, further comprising:
learning or estimating the schedule of the user;
generating a further question for confirming a learning result or an estimation result of the schedule of the user, and receiving an answer to the further question from the user; and
updating the schedule of the user based on the answer to the further question from the user.

15. The charge management method according to claim 13, further comprising determining a charge schedule of the battery of the mobile body based on at least one of information related to a power distribution reserve capacity of the power distribution network and information related to a power demand of the power distribution network.

16. A mobile body used by a user, the mobile body comprising:
a battery;
an interface configured to acquire information related to a schedule of the user; and
a control unit configured to manage charging of the battery based on the information related to the schedule of the user,
wherein
the interface is configured to
output a question about the schedule of the user, and
acquire an answer to the question from the user as the information related to the schedule of the user, the answer being input by voice and including a scheduled departure time of the user,
the control unit is configured to, in response to the answer acquired by the interface,
update the schedule of the user based on the answer from the user, and
generate the charge schedule of the battery of the mobile body based on the answer from the user,
the interface is configured to acquire information related to a power distribution network that supplies electric power to charge the battery of the mobile body, and
the control unit is configured to manage the charge schedule of the battery of the mobile body used by the user further based on the information related to the power distribution network.

17. The mobile body according to claim 16, wherein the control unit is configured to:
learn or estimate the schedule of the user;
generate a further question for confirming a learning result or an estimation result of the schedule of the user, and receive an answer to the further question from the user; and
update the schedule of the user based on the answer to the further question from the user.

18. The charge management device according to claim 1, wherein the control unit is configured to, in response to generating the charge schedule of the battery of the mobile body, output the charge schedule of the battery of the mobile body to another mobile body different from the mobile body.

19. The charge management method according to claim 13, further comprising:
in response to generating the charge schedule of the battery of the mobile body, outputting the charge schedule of the battery of the mobile body to another mobile body different from the mobile body.

20. The mobile body according to claim 16, wherein the control unit is configured to, in response to generating the charge schedule of the battery of the mobile body, output the charge schedule of the battery of the mobile body to another mobile body different from the mobile body.

* * * * *